Figure 1A:
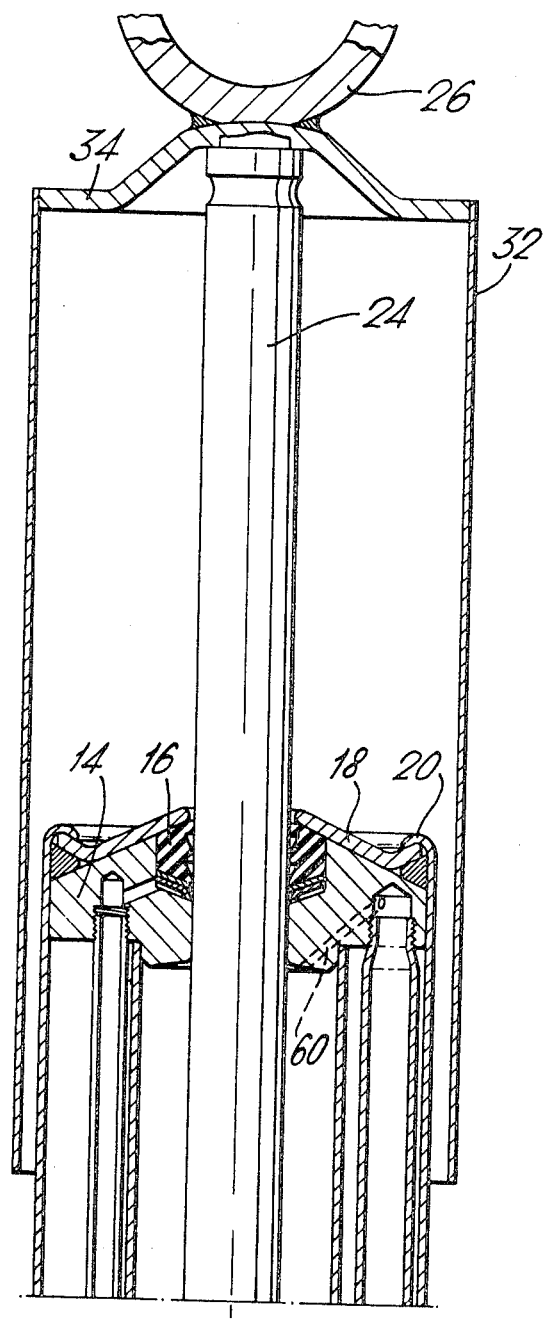

United States Patent

[11] 3,584,712

[72] Inventor Ronald S. Dickinson
 Osbaldwick, York, England
[21] Appl. No. 824,196
[22] Filed May 13, 1969
[45] Patented June 15, 1971
[73] Assignee Armstrong Patents Co. Limited
 London, England
[32] Priority May 25, 1968
[33] Great Britain
[31] 25098/68

[54] TELESCOPIC HYDRAULIC SHOCK ABSORBERS
 7 Claims, 3 Drawing Figs.
[52] U.S. Cl. .................................................. 188/282,
 188/318
[51] Int. Cl. ................................................. F16f 9/44
[50] Field of Search ........................................... 188/88.51,
 96.2, .51, 97, 97.1, 88.505

[56] References Cited
 UNITED STATES PATENTS
 1,281,774 9/1918 Franckaerts .................. 188/97 UX
 1,869,604 8/1932 McWhirter .................... 188/97 (.1)
 2,182,016 12/1939 Deutsch ........................ 188/97 UX
 FOREIGN PATENTS
 244,836 5/1963 Australia ...................... 188/96 (.2)

Primary Examiner—George E. A. Halvosa
Attorney—Beveridge and DeGrandi

ABSTRACT: The invention is an improvement in vehicle telescopic shock absorbers of the type in which a piston carried on a piston rod extending from one end of a pressure tube is slidably displaceable within said pressure tube and the latter is arranged coaxially within an outer reservoir tube with which it cooperates to define an annular space constituting a reservoir for hydraulic fluid, and in which simple closure valves arranged in the piston and between the tube ends remote from the piston rod, control the flow of hydraulic fluid between the pressure tube and the reservoir.

The invention provides that these closure valves are arranged respectively to prevent fluid flow through the pistons during extension strokes of the shock absorber and to prevent fluid flow from the pressure tube space in front of the piston to the reservoir during the compression strokes; that the flow of fluid from the pressure tube space behind the piston to the reservoir is confined to a single path which has a single hydraulic damping valve interposed therein to restrict the flow of fluid therethrough; and that the ratio of the cross-sectional areas of the piston and piston rod being selected to produce a predetermined differential between volumes of fluid within the pressure tube displaced by identical piston movements in the two opposed directions and thereby to establish a predetermined differential between the hydraulic damping rates in the two directions.

INVENTOR:
RONALD S. DICKINSON

INVENTOR:
RONALD S. DICKINSON

TELESCOPIC HYDRAULIC SHOCK ABSORBERS

This invention concerns vehicle shock absorbers and relates to telescopic shock absorbers of the type in which a piston carried on a piston rod extending from one end of a pressure tube is slidably displaceable within said pressure tube and the latter is arranged coaxially within an outer reservoir tube with which it cooperates to define an annular space constituting a reservoir for hydraulic fluid and in which valves arranged in the piston and between the tube ends remote from the piston rod control the flow of hydraulic fluid between the pressure tube and the reservoir.

A number of telescopic shock absorbers have already been proposed employing a construction of the type defined above. For example, one widely used construction of shock absorber is fitted with a spring-loaded hydraulic damping valve in the piston to control the flow of hydraulic fluid through the piston as the latter moves further into the pressure tube during compression strokes of the shock absorber and with a second damping valve arranged in a fluid flow path between the reservoir and the space in the pressure tube behind the piston, to damp piston movements in the extension direction. As a result of such a valve arrangement, the fluid flow in this construction of shock absorber always takes place in one direction around the shock absorber. In another shock absorber construction, the damping valve in the piston is arranged to control the flow of fluid through the piston from the space behind it to the space in front of it as the piston moves outwardly in the pressure tube, that is to say, during extension strokes of the shock absorber, while a second damping valve, controlling the return of fluid from the pressure tube space in front of the piston to the reservoir is arranged in a valve block fitted at the end of the pressure tube remote from the piston rod. Auxiliary non-return valves are also provided in the valve block and in the piston for respectively permitting recuperation of hydraulic fluid from the reservoir into the pressure tube space in front of the piston during extension strokes of the shock absorber and for permitting fluid flow through the piston during compression strokes. Fluid flow in this construction thus takes place in two directions in the shock absorber.

In both of the prior art shock absorber constructions discussed above, as in other constructions of a generally similar character, there are always two hydraulic damping valves and there may be additional, auxiliary valves for controlling the direction of flow of the hydraulic fluid within the shock absorber. Usually, the two hydraulic damping valves have valve closure members which are spring biased towards cooperating valve seats and the spring loading on those closure members determines the resistance to the flow of hydraulic fluid in the shock absorber during its compression and extension strokes. In most instances, the spring settings are calculated and are adjusted in manufacture to produce a greater resistance to fluid flow and hence a greater degree of damping during the extension stroke of the shock absorber than during the compression stroke, with a predetermined ratio between the damping offered in the two directions. If, for some special purpose, it is desired to provide the user of the shock absorber with facility for adjusting the damping characteristic, then it has already been proposed to substitute the appropriate valve closure member by a fluid flow restrictor such as a so-called needle valve and to provide an externally manually operable control member on the shock absorber for altering the setting of that fluid flow restrictor relative to its seat. However, since it is not normally feasible to enable the setting of more than one of the damping valves to be manually adjusted by the user, the useful range of manual adjustment available to him is limited by the need to avoid an unrealistic imbalance between the damping in the compression and the extension directions.

According to the present invention, in a shock absorber of the type defined, the valves in the piston and at the tube ends remote from the piston rod are simple closure valves arranged respectively to prevent fluid flow through the piston during extension strokes of the shock absorber and to prevent fluid flow from the pressure tube space in front of the piston to the reservoir during compression strokes, passage means are provided to confine the flow of hydraulic fluid from the pressure tube space behind the piston to the reservoir to a single path and a single hydraulic damping valve is interposed in said path to restrict the flow of fluid therein and thereby to damp piston movements in both directions in the pressure tube, the ratio between the cross-sectional areas of the piston and the piston rod being chosen to establish a predetermined differential between the volumes of fluid displaced by identical piston movements in the two opposed directions and thereby to establish a predetermined differential between the hydraulic damping rates in said two directions.

The single hydraulic damping valve may be adjustable, thus enabling adjustment to be made of the degree of hydraulic damping offered to the piston movement both in the compression and in the extension direction and preserving the predetermined damping ratio. This is in contrast to the prior art constructions referred to above which enable the damping in only one direction of piston movement to be varied. Conveniently, the hydraulic damping valve employed in the invention is a needle valve or is a rotary valve provided with a plurality of circularly distributed ports of different cross section. The adjustment may be effected either electrically, as by means of a solenoid actuating a ball and ratchet assembly mechanically coupled to the needle valve or rotary valve, but alternatively the adjustment may be effected mechanically by way of a cable.

Figure 1B:
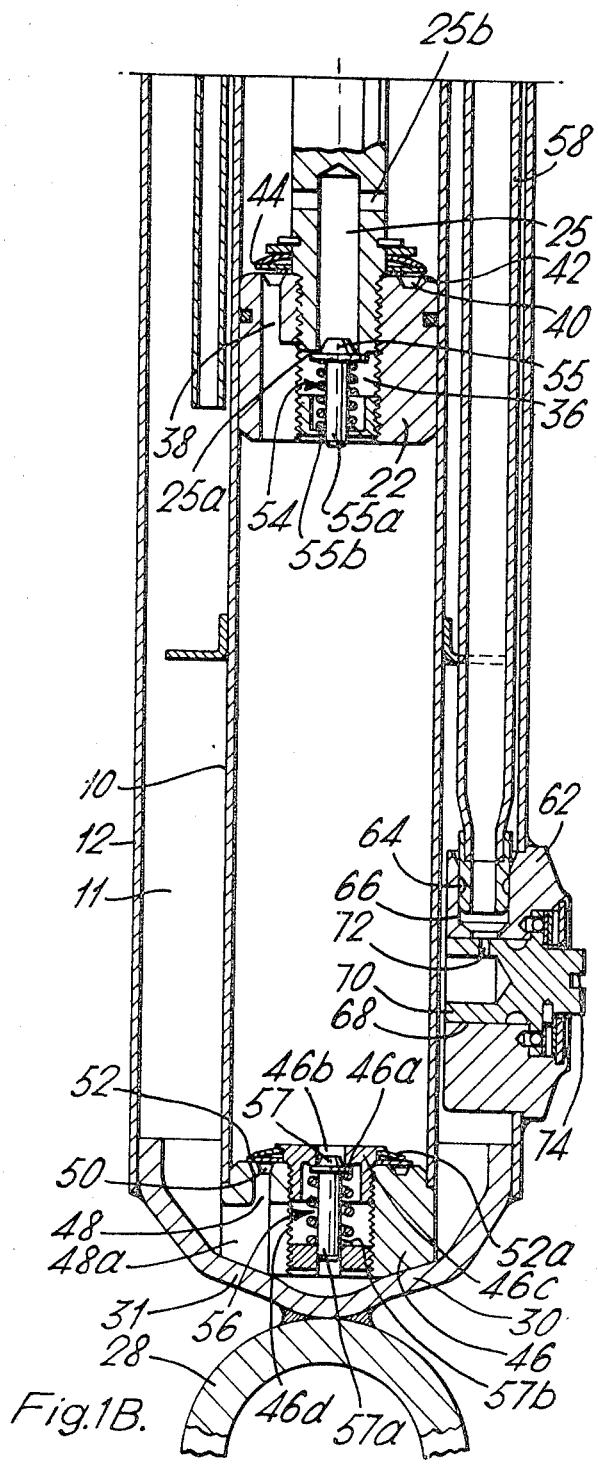
Figure 2:
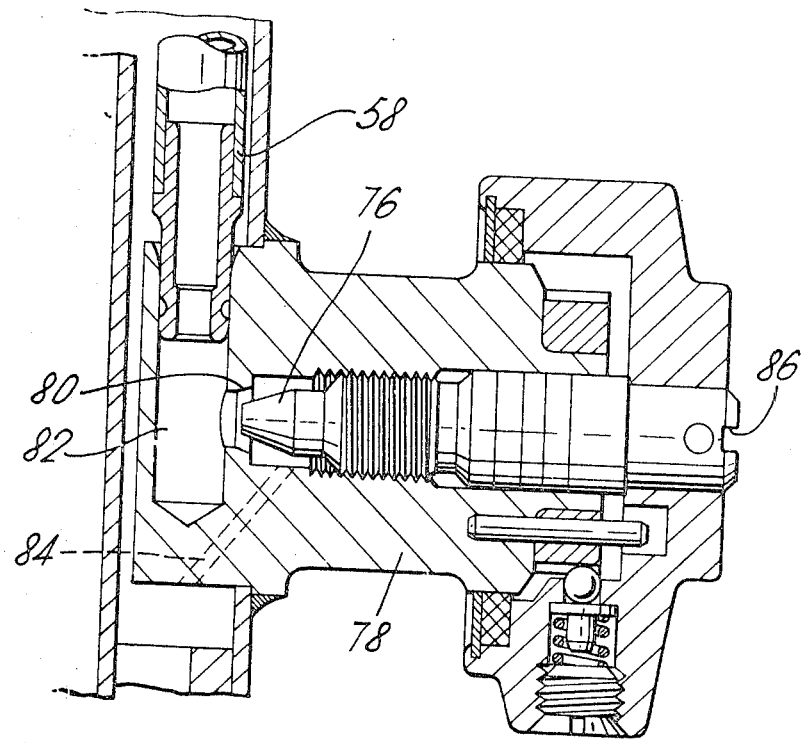

The invention will be described further, by way of example, with reference to the accompanying drawings, in which:

FIGS. 1A and 1B are together an axial section through a telescopic shock absorber embodying the invention and FIG. 2 is a similar view, to an enlarged scale, through an alternative embodiment of damping valve.

Referring firstly to FIGS. 1A and 1B of the drawings, the hydraulic shock absorber therein illustrated comprises a cylindrical inner tube or pressure tube 10 arranged coaxially within an outer reservoir tube 12, the two tubes being closed and mutually located at their upper ends by means of an assembly including a piston rod bearing or guide 14 and a sealing gland 16 which together are held in position by an end closure disc 18 retained under an inturned peripheral lip 20 of the reservoir tube 12.

A piston 22 carried on the inner end of a piston rod 24 is slidably received within the pressure tube 10, the piston rod 24 being guided and hydraulically sealed in the bearing and sealing gland assembly 14, 16 and extending at its free end beyond the reservoir tube 10 to terminate in an eye 26 by which the shock absorber may be connected to an appropriate part of a vehicle. A similar eye 28 is secured to the crown of a generally hemispherical cover 30 closing the opposite end of the reservoir tube. A shroud 32 depends from the circular end cover 34 carried at the free end of the piston rod 24 and coaxially surrounds the adjacent end of the reservoir tube to protect the same from foreign matter. The piston 22 is formed with an internally threaded axial bore 36 by which it is secured to the correspondingly threaded inner end of the piston rod 24. The piston 22 is also formed with an axially parallel passage 38 opening at the upper axial end face of the piston into an annular groove 40 provided in that face and surrounding it to define a valve seat 42 which cooperates with a spring-loaded plate valve closure member 44. As will be appreciated, during extension strokes of the shock absorber, when the piston 22 moves in an outward direction in the cylinder 10, the plate valve closure member 44 deflects to close against the valve seat 42 and prevent the flow of hydraulic fluid through the passage 38.

At the ends of the tubes 10 and 12 in front of the piston, the pressure tube 10 is closed by a valve block 46 which is seated on the cover 30, the cover 30 for this purpose being formed with an inclined shoulder 31 which positively locates the valve block and thereby acts to locate the pressure tube 10 within and relative to the reservoir tube 12. The annular space 11 between the tubes 10 and 12 constitutes a reservoir for hydraulic fluid and communication between the reservoir 11 and the pressure tube space in front of the piston is permitted by way of an axially parallel passage 48 formed in the valve block 46. The passage 48 opens into an annular groove 50 in the axial inner end face of the valve block 46 and this groove cooperates with the aforementioned end face to define a valve seat which is normally closed by a spring-biased nonreturn plate valve closure member 52. As will be appreciated, the closure member 52 opens to permit recuperation of hydraulic fluid into the pressure tube space in front of the piston as the latter undergoes an extension stroke but closes to prevent the reverse flow of fluid during a compression stroke.

As has already been noted the two valves 44 and 52 are simple nonreturn closure valves and they are complemented in the piston 22 and valve block 46 respectively by spring-loaded safety valves 54 and 56.

The valve 54 will be seen to include a conical valve closure member 55 carried on a stem 55a and urged by a compression spring 55b towards a valve seat 25a circumscribing the free terminal end of an axial bore 25 formed at the inner end of the piston rod 24. The bore 25 communicates with the pressure cylinder space behind the piston by way of radial ports 25b also formed in the piston rod and it will be seen that the arrangement is such that the safety valve 54 is capable of opening only during extension strokes of the piston. The valve 56 is of a generally similar construction and comprises a conical valve closure member 57 carried on a stem 57a and urged by a compression spring 57b towards a valve seat 46a terminating an axial bore 46b of a threaded nut 46c engaged in the valve block 46 and serving additionally by way of a domed spring washer 52a to hold the plate valve closure member 52 in its position The bore 46b in the nut 46c cooperates with a radial port 46d of the nut and with a radial port 48a of the valve block to permit communication between the reservoir 11 and the pressure tube space in front of the piston. It will be noted that such communication is possible only during compression strokes of the piston. The loading exerted on the valve members 55 and 57 by the springs 55b and 57b respectively is predetermined to permit them to open only in consequence of an abrupt movement of the piston in the pressure tube 10, for example should the vehicle encounter a severe discontinuity in the road surface.

Within the hydraulic reservoir there is arranged a bleed tube 58 which depends from the piston rod bearing 14 and which communicates with the interior of the pressure tube 10 by way of a duct 60 formed in the bearing 14. The duct 60 and bleed tube 58 constitute the only path for fluid flow from the pressure tube space behind the piston back into the reservoir 11. As shown in FIG. 1, the reservoir tube 12 is apertured to receive a valve housing 62 and the bleed tube 58 has a reduced diameter free end which fits within a bush 64 forming a sliding but fluidtight seal within a radial port 66 formed in the housing 62. The housing 62 is axially bored at 68 and the axial bore 68 intersects the radial port 66. Within the axial bore 68 there is arranged a rotatable valve member 70 formed with a plurality of circularly distributed radial ports of which one port 72 is visible in FIG. 1. The outer end of the rotatable valve member 70 projects beyond the valve housing 62 to be accessible externally of the shock absorber and terminates in an end face having a screwdriver slot 74. The radial ports formed in the valve member 70 are all of different cross-sectional area and thus by using a screwdriver or similar tool to rotate the valve member by way of the slot 74, it is possible to vary the resistance to the flow of hydraulic fluid from the bleed tube 58 back into the reservoir 11 and thus to vary the degree of hydraulic damping imparted to the piston 22.

FIG. 2 illustrates an alternative construction of damping valve in which the valve member for adjusting the flow restriction offered to the flow of hydraulic fluid through the bleed tube 58 is a conical valve member 76 threadedly engaged within a valve housing 78 and cooperating with a conical valve seat 80 interposed between an inlet port 82 and an outlet port 84 of the housing 78, the outlet port 84 leading to the reservoir 11. The valve member 76 is accessible externally of the housing 78 in an end face terminating in a screwdriver slot 86 and it will be appreciated that, as compared with the damping valve shown in FIG. 1B, the damping valve illustrated in FIG. 2 enables adjustment to be made continuously between predetermined end limits, as opposed to the discreet adjustment steps permitted by the valve of FIG. 1B.

In other instances, manual screwdriver adjustment may be replaced by a remotely controlled adjustment such as a mechanical cable adjustment or an electrical adjustment.

I claim:

1. In a vehicle telescopic shock absorber of the type including a pressure tube, a piston slidable in said pressure tube, a reservoir means associated with said pressure tube for supplying hydraulic fluid thereto, first check valve means between said reservoir and pressure tube on one side of said piston for permitting hydraulic flow from said reservoir to said pressure tube during an extension stroke of the piston relative to the pressure tube and preventing flow from the pressure tube on one side of said piston to said reservoir during a compression stroke of said piston relative to the pressure tube, second check valve means on said piston means for preventing fluid flow between said one side of said piston means and the other side thereof during the extension stroke and permitting flow from said one side of said piston means to the said other side during the compression stroke; the improvement comprising in combination a first safety check valve means associated with said first check valve means normally closing communication between the pressure tube on said one side of said piston and the reservoir during normal operation of the piston but opening communication between said pressure tube and said reservoir when the pressure in the pressure tube on said one side of said piston exceeds a predetermined amount, a second safety check valve means associated with said second check valve means normally closing communication between opposite sides of said piston during normal operation of said piston in said pressure tube but opening communication between said opposite sides of said piston when the pressure in the pressure tube on said other side of said piston exceeds a predetermined amount, passage means between the reservoir and the pressure tube on said other side of said piston, confining the flow of hydraulic fluid between the pressure tube on said other side of said piston and said reservoir to a single path, and an adjustable damping valve control means located in said passage means for restricting the flow of hydraulic fluid therein to said other side of the piston thereby damping piston movement in both directions in the pressure tube, the ratio between the effective cross-sectional areas on opposite sides of said piston being chosen to establish a predetermined differential between the volumes of hydraulic fluid displaced by identical piston movements in opposite directions to establish a predetermined differential between hydraulic damping rates when the piston moves in said opposite directions.

2. The combination defined in claim 1 wherein said valve control means includes a rotatable valve member having a plurality of circumferentially distributed ports of different cross-sectional areas to be placed in selective communication with said passage means upon rotation of said valve member.

3. The combination defined in claim 1 wherein said valve control means including means defining a port surrounded by a valve seat, and a conical valve head movable towards and away from said seat for selectively varying the area between the valve head and the seat.

4. The combination defined in claim 1 further including an additional safety valve means arranged in said passage means and acting to assist said control valve means in regulating the fluid pressure generated during the compression stroke.

5. The combination defined in claim 1 wherein said reservoir surrounds said pressure tube, and includes a bleed tube having one end in communication with said pressure tube on said other side of said piston, the other end of said bleed tube communicating with said adjustable control valve means, said bleed tube constituting a part of said passage means.

6. The combination defined in claim 5 wherein said control valve means includes a housing mounted in a sidewall portion of said reservoir, said housing having a flow passage receiving said other end of said bleed tube, and a movable valve member mounted in said housing for controlling flow between the reservoir and said bleed tube.

7. The combination defined in claim 6 wherein said passage means includes a passage formed in one end of said pressure tube communicating with said one end of said bleed tube and the interior of the pressure tube on said other side of said piston means.